(12) United States Patent
Yoshimura

(10) Patent No.: US 12,172,801 B2
(45) Date of Patent: Dec. 24, 2024

(54) ZIPPER TAPE AND CONTAINER EQUIPPED WITH ZIPPER TAPE

(71) Applicant: IDEMITSU UNITECH CO., LTD., Tokyo (JP)

(72) Inventor: Hiroaki Yoshimura, Chiba (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 455 days.

(21) Appl. No.: 17/614,581

(22) PCT Filed: May 28, 2020

(86) PCT No.: PCT/JP2020/021189
§ 371 (c)(1),
(2) Date: Nov. 29, 2021

(87) PCT Pub. No.: WO2020/241777
PCT Pub. Date: Dec. 3, 2020

(65) Prior Publication Data
US 2022/0227540 A1 Jul. 21, 2022

(30) Foreign Application Priority Data

May 31, 2019 (JP) ................................. 2019-102598
Feb. 25, 2020 (JP) ................................. 2020-029300

(51) Int. Cl.
*B65D 33/25* (2006.01)
*A44B 19/16* (2006.01)
(Continued)

(52) U.S. Cl.
CPC .......... *B65D 33/2508* (2013.01); *A44B 19/16* (2013.01); *B65D 65/466* (2013.01);
(Continued)

(58) Field of Classification Search
CPC ....... A44B 19/16; B65D 65/466; C08L 67/02; C08L 2201/06; C08L 2205/025
See application file for complete search history.

(56) References Cited

U.S. PATENT DOCUMENTS 5,883,199 A 3/1999 McCarthy et al.
2003/0019780 A1 1/2003 Parodi et al.
(Continued)

FOREIGN PATENT DOCUMENTS

CN 1535234 A 10/2004
CN 1972610 A 5/2007
(Continued)

OTHER PUBLICATIONS

English machine translation for 2007137461. (Year: 2007).*
(Continued)

*Primary Examiner* — Michael C Miggins
(74) *Attorney, Agent, or Firm* — MILLEN, WHITE, ZELANO & BRANIGAN, P.C.; Ryan R. Pool

(57) ABSTRACT

A zipper tape is in an elongated shape and includes, in a cross-sectional shape, a pair of base strips and engagement portions projecting from surfaces facing each other of the pair of respective base strips, the engagement portions being engageable with each other. At least the engagement portions are each formed of a first biodegradable resin composition having a yield strain of 3.4% or more during a tensile test.

9 Claims, 3 Drawing Sheets

(51) Int. Cl.
 *B65D 65/46* (2006.01)
 *C08L 67/02* (2006.01)

(52) U.S. Cl.
 CPC .......... *C08L 67/02* (2013.01); *C08L 2201/06* (2013.01); *C08L 2205/025* (2013.01)

(56) References Cited

U.S. PATENT DOCUMENTS

| | | |
|---|---|---|
| 2008/0031552 A1 | 2/2008 | Tanaka et al. |
| 2018/0086508 A1 | 3/2018 | Namba |
| 2018/0257820 A1 | 9/2018 | Tameda et al. |
| 2021/0198477 A1 | 7/2021 | Goto et al. |

FOREIGN PATENT DOCUMENTS

| | | |
|---|---|---|
| CN | 108472860 A | 8/2018 |
| JP | 7-257602 A | 10/1995 |
| JP | 10-146936 A | 6/1998 |
| JP | 2004-190020 A | 7/2004 |
| JP | 2007-137461 A | 6/2007 |
| JP | 4889285 B2 | 12/2011 |
| JP | 2012-233120 A | 11/2012 |
| JP | 2016208849 A | 12/2016 |
| JP | 2017-77916 A | 4/2017 |
| TW | 201641378 A | 12/2016 |
| TW | 201718360 A | 6/2017 |

OTHER PUBLICATIONS

English machine translation for 2011234718. (Year: 2011).*
English machine translation for 2017077916. (Year: 2017).*
English machine translation for CN1311967, Apr. 25, 2007. (Year: 2007).*
English machine translation for CN1311967 (Year: 2007).*
English machine translation for JP2007137461 (Year: 2007).*
English machine translation for JP2011234718 (Year: 2011).*
English machine translation for JP2017077916 (Year: 2017).*
Office Action in corresponding CN application: 202080038137.X dated Feb. 4, 2023 (pp. 1-9).
Office Action in corresponding JP application 2021-522877 dated Feb. 6, 2024 (pp. 1-4).
International Search Report dated Sep. 1, 2020 issued in corresponding PCT/JP2020/021189 application (2 pages).
Search Report issued in corresponding European patent application No. 20815300.7 on Jun. 29, 2023 (pp. 1-6).

* cited by examiner

ZIPPER TAPE AND CONTAINER EQUIPPED WITH ZIPPER TAPE

TECHNICAL FIELD

The present invention relates to a zipper tape and a zipper-tape-equipped container.

BACKGROUND ART

A technology to form a container from a biodegradable material in terms of environmental load has been known. For instance, Patent Literature 1 describes a production method of a zipper part for a biodegradable zippered bag, the method including: melting a resin composition containing, as a main component, an aliphatic polyester resin with a flexural modulus in a range from 150 MPa to 400 MPa; and forming the zipper part including a projecting member and a recessed member by extruding the resin composition from a die with an opening for forming zipper parts and then cooling the resin composition at a speed of 40 degrees C./second to 60 degrees C./second.

CITATION LIST

Patent Literature(s)

Patent Literature 1: JP 4889285 B

SUMMARY OF THE INVENTION

Problem(s) to be Solved by the Invention

However, even a typical technology still leaves room for improvement in terms of shape stability and engagement strength in a case where a zipper tape is formed of a biodegradable resin composition.

Accordingly, an object of the invention is to provide a zipper tape and a zipper-tape-equipped container that enable an improvement in shape stability and engagement strength in a case where a zipper tape is formed of a biodegradable resin composition.

Means for Solving the Problem(s)

According to an aspect of the invention, a zipper tape is provided, the zipper tape being in an elongated shape and including, in a cross-sectional shape, a pair of base strips and engagement portions projecting from respective surfaces facing each other of the pair of base strips, the engagement portions being engageable with each other, in which at least the engagement portions are each formed of a first biodegradable resin composition having a yield strain of 3.4% or more during a tensile test.

According to another aspect of the invention, a zipper-tape-equipped container is provided, the zipper-tape-equipped container including the zipper tape described above and a container body to which the zipper tape is bonded.

According to the aspects of the invention, it is possible to provide a zipper tape and a zipper-tape-equipped container that enable an improvement in shape stability and engagement strength in a case where a zipper tape is formed of a biodegradable resin composition.

BRIEF DESCRIPTION OF DRAWING(S)

DESCRIPTION OF EMBODIMENT(S)

A detailed description will be made below on preferred exemplary embodiments of the invention with reference to the attached drawings. It should be noted that the same reference sign is used to refer to constituent elements having substantially the same functional configuration and a redundant description thereof is omitted accordingly.

It should be noted that a content of a component of a resin composition is intended as mass % relative to the entire resin composition in the description below unless otherwise specified. In addition, a main component of a resin composition refers to a resin component a content of which is the largest among those of resin components in the entire single-layer resin composition or among layers of a multi-layer resin composition.

First Exemplary Embodiment

Figure 1:
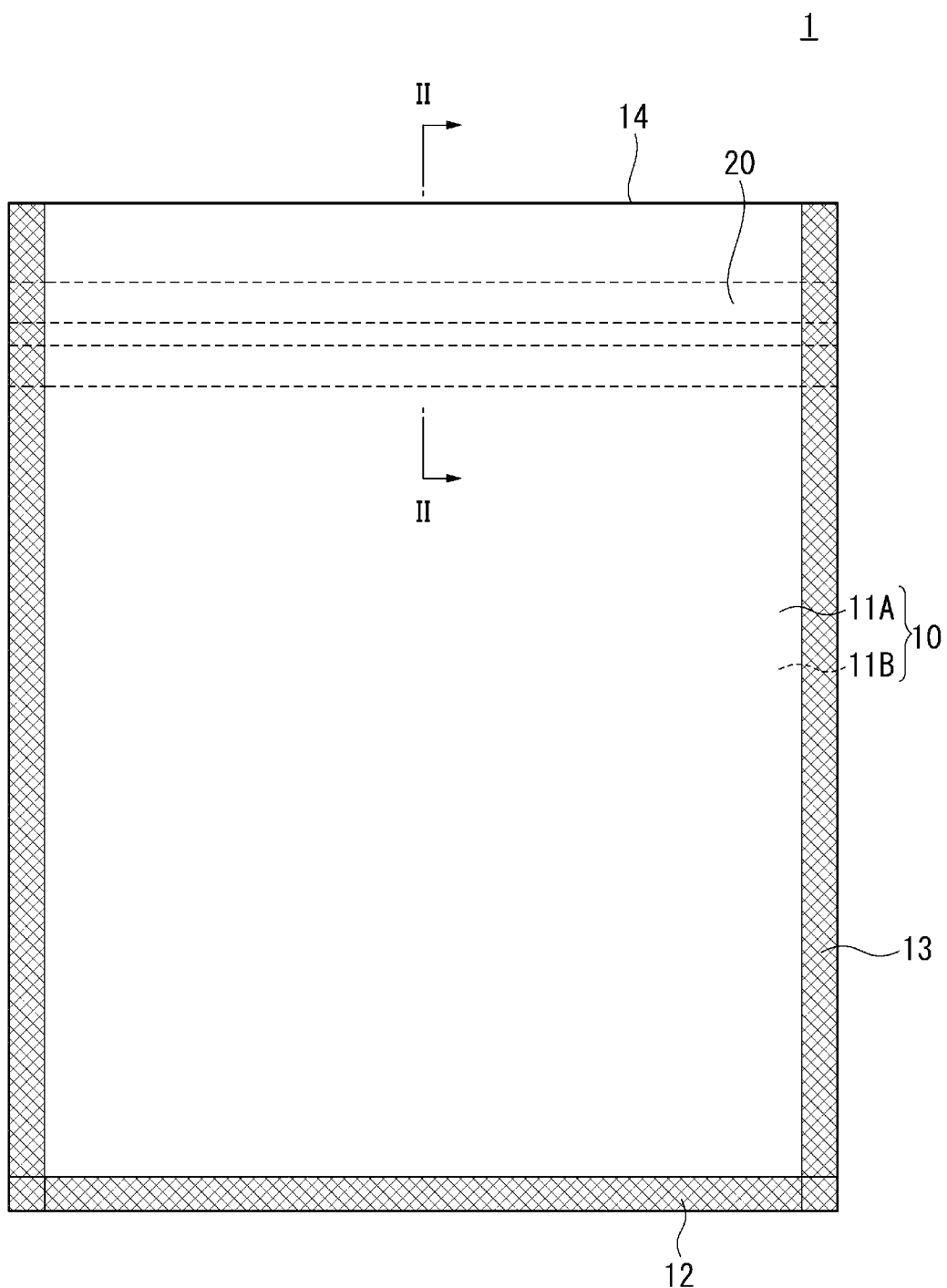
FIG. 1 is a plan view of a zipper-tape-equipped bag according to a first exemplary embodiment of the invention.
Figure 2:
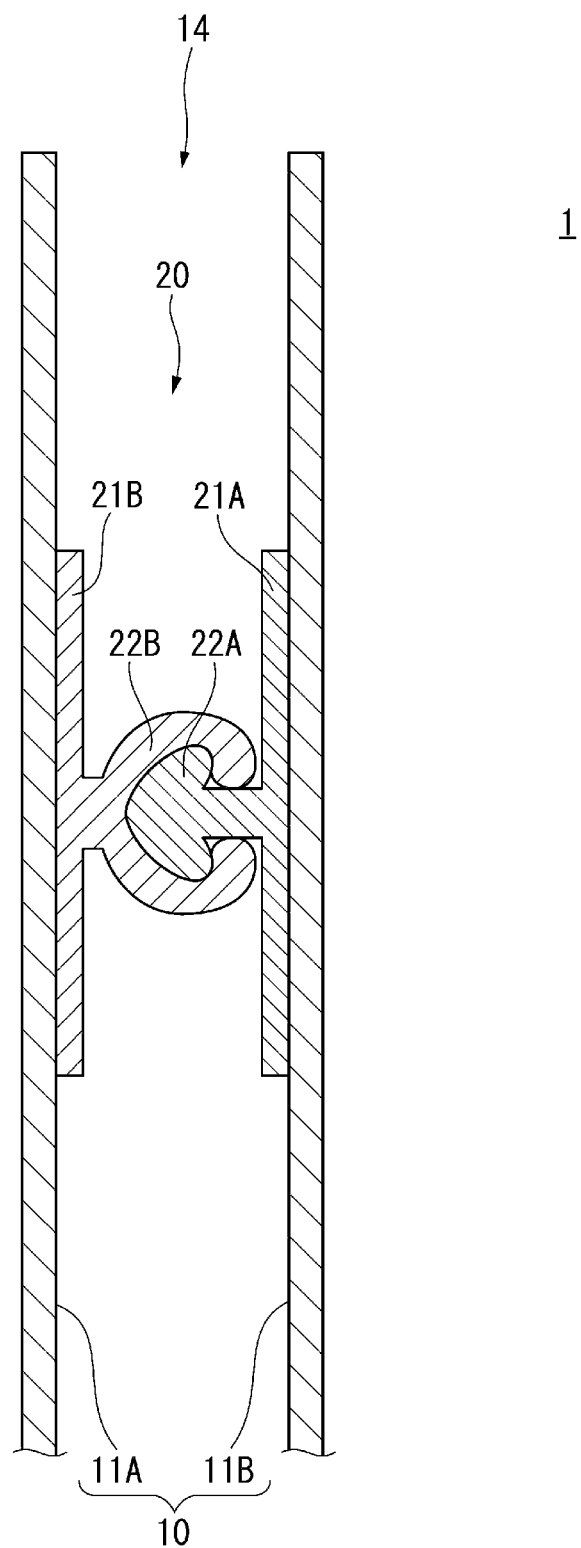
FIG. 2 is a cross-sectional view of the zipper-tape-equipped bag taken along a line II-II shown in FIG. 1.

FIG. 1 is a plan view of a zipper-tape-equipped bag according to a first exemplary embodiment of the invention and FIG. 2 is a cross-sectional view of the zipper-tape-equipped bag taken along a line II-II shown in FIG. 1. As shown in FIG. 1 and FIG. 2, a zipper-tape-equipped bag 1 according to the first exemplary embodiment includes a film 10 formed into a bag body having a first surface 11A and a second surface 11B and a zipper tape 20.

The film 10, which is a container body in this exemplary embodiment, is formed of, for instance, a single-layer or multi-layer thermoplastic resin. More specifically, the film 10 may include a layer formed of low-density polyethylene (LDPE), linear low-density polyethylene (LLDPE), or polypropylene (PP). PP may be polypropylene homo-polymer (HPP), polypropylene random copolymer (RPP), or polypropylene block copolymer (BPP). In a case where the film 10 is a multi-layer film, an outer base material may include biaxially oriented polypropylene (OPP), biaxially oriented polyethylene terephthalate (OPET), or biaxially oriented nylon (ONy). Further, the film 10 may include an inorganic material layer formed by aluminum deposition, stacking aluminum foil layers, or the like. Further, it is preferable that the film 10 is also provided by a single-layer or multi-layer structure of a biodegradable resin composition in terms of environmental load. As a sealant, a variety of biodegradable resin compositions are usable; for instance, polybutylene succinate (PBS) or poly(butylene succinate/adipate) (PBSA) may be used. Paper (kraft paper) or cellophane may be used as the outer base material.

It should be noted that in this exemplary embodiment, two sheets of the film 10 are bonded to each other at a bottom seal portion 12 and a side seal portion 13 to be formed into the bag body having the first surface 11A and the second surface 11B; however, a single sheet of the film 10 may be folded at a portion corresponding to the side seal portion 13 to provide the first surface 11A and the second surface 11B in another exemplary embodiment. Alternatively, a portion corresponding to the bottom seal portion 12 or the side seal portion 13 in the example in FIG. 1 may be provided with a so-called gusset, i.e., a portion where the film 10 is folded inside. In this case, the gusset may be formed from the film 10 or another film bonded to the film 10. Further, the zipper-tape-equipped bag 1 may be in the form of a stand up pouch that can be placed upright by means of a gusset formed at a bottom portion.

Further, in this exemplary embodiment, the bottom seal portion 12 and the side seal portion 13 are formed but no top seal portion is formed, so that an opening 14 of the zipper-tape-equipped bag 1 is provided; however, in another exemplary embodiment, with a top seal portion formed in addition to the bottom seal portion 12 and the side seal portion 13, the opening 14 may be provided afterward in the zipper-tape-equipped bag 1 by cutting the zipper-tape-equipped bag 1 between the top seal portion and the zipper tape 20. In still another exemplary embodiment, a bag body with no bottom seal portion 12 formed, that is, the zipper-tape-equipped bag 1 not sealed opposite the zipper tape 20, may be provided. In this case, the bottom seal portion 12 is formed after contents are packed in the zipper-tape-equipped bag 1. In addition to the above, a zipper-tape-equipped container according to the exemplary embodiment of the invention can be provided by bonding a zipper tape to any of bags and containers other than bags having a variety of known configurations as long as the zipper tape is to be welded thereto.

As shown in FIG. 2, the zipper tape 20 is an elongated member, including: in a cross-sectional shape, a pair of base strips 21A and 21B that are to be bonded respectively to the first surface 11A and the second surface 11B of the film 10; and engagement portions 22A and 22B projecting from surfaces facing each other of the respective base strips 21A and 21B and that are engageable with each other. In an example as shown, the engagement portion 22A is in a male shape in a cross section and the engagement portion 22B is a female shape in a cross section. By engaging these engagement portions 22A and 22B with each other, the zipper tape 20 is closed to seal the opening 14 of the zipper-tape-equipped bag 1. It should be noted that shapes of the engagement portions 22A and 22B are not limited to the male shape and the female shape, and shapes of engagement portions of a variety of known zipper tapes, such as a combination of a claw shape, a hook shape, or a knot shape, are applicable to the engagement portions 22A and 22B in the above example. Further, although a pair of engagement portions are disposed in the example as shown, a plurality of pairs of engagement portions may be disposed.

In this exemplary embodiment, the base strips 21A and 21B and the engagement portions 22A and 22B of the zipper tape 20 are formed of a biodegradable resin composition having a yield strain of 3.4% or more during a tensile test. Here, the yield strain during the tensile test can be measured according to "JIS K 7161: 2014 Plastics—Determination of tensile properties." The yield strain is preferably 4% or more, more preferably 5% or more, further preferably 7% or more, much further preferably 10% or more, particularly preferably 15% or more. At a yield strain of 3.4% or more, the zipper tape becomes less plastically deformable and thus suitable for repeated use. The upper limit is usually, but not limited thereto, approximately 30%. Resin compositions with biodegradability, such as resins derived from organic resources or the like and resins derived from petroleum, are usable as the biodegradable resin composition forming the base strips 21A and 21B and the engagement portions 22A and 22B. Among the above, the biodegradable resin composition preferably contains at least one of the group consisting of polylactide (PLA), polybutylene succinate (PBS), poly(butylene adipate/terephthalate) (PBAT), polycaprolactone (PCL), poly(caprolactone/butylene succinate) (PCLBS), poly(butylene succinate/adipate) (PBSA), poly (butylene succinate/carbonate) (PEC), poly(ethylene terephthalate/succinate) (PETS), poly(tetramethylene adipate/terephthalate) (PTMAT), polyethylene succinate (PES), polyvinyl alcohol (PVA-H), polyglycolic acid (PGA), and poly (hydroxybutyrate/hydroxyhexanoate) (PHBH), more preferably contains at least one of the group consisting of PLA, PBS, PBAT, and PBSA, preferably contains PBS, PBAT, and PBSA, further preferably contains PBS and PBAT, particularly preferably consists of PBS and PBAT. Even in a case where the biodegradable resin composition consists of PBS and PBAT, inclusion of additives, such as a slip agent, an anti die-drool agent, and an antioxidant, and impurities is acceptable. In addition, the biodegradable resin composition forming the base strips 21A and 21B and the engagement portions 22A and 22B may further contain a plasticizer. For instance, glycerin fatty acid ester is usable as the plasticizer.

In a case where the biodegradable resin composition forming the base strips 21A and 21B and the engagement portions 22A and 22B contains PBS and PBAT or consists of PBS and PBAT, it is preferable that PBS is in a range from 50 to 99% and PBAT is in a range from 1% to 50%, it is more preferable that PBS is in a range from 60% to 90% and PBAT is in a range from 10% to 40%, and it is further preferable that PBS is in a range from 60% to 80% and PBAT is in a range from 20% to 40%.

In this exemplary embodiment, by means of the base strips 21A and 21B and the engagement portions 22A and 22B of the zipper tape 20 being formed of the biodegradable resin composition as described above, it is possible to improve shape stability and engagement strength of, in particular, the engagement portions 22A and 22B in spite of the use of the biodegradable resin composition, which is low in environmental load.

It should be noted that although components of the resin composition forming the film 10 are not limited in the above example, it is preferable that the film 10 is also provided by a single-layer or multi-layer structure of a biodegradable resin composition in terms of environmental load. In this case, components of a resin composition forming seal surfaces of the base strips 21A and 21B, that is, surfaces opposite the respective engagement portions 22A and 22B, are adjusted in accordance with components of a biodegradable resin composition forming a sealant layer of the film 10 facing the base strips 21A and 21B of the zipper tape 20, for instance, in a manner described below, thereby making it possible to favorably bond the zipper tape 20 to the sealant layer of the film 10.

More specifically, for instance, in a case where the biodegradable resin composition forming the zipper tape 20 contains 40% to 80% of PBS, the zipper tape 20 can be favorably bonded to the film 10 irrespective of whether PLA or PBS is the main component of the biodegradable resin composition forming the sealant layer of the film 10. Further, for instance, in a case where the biodegradable resin composition forming the zipper tape 20 contains 40% or more of PLA, a favorable adhesiveness is achievable as long as the biodegradable resin composition forming the sealant layer of the film 10 contains PLA as a main component. Further, for instance, in a case where the biodegradable resin composition forming the zipper tape 20 contains 20% or more of PBS, a favorable adhesiveness is achievable as long as the biodegradable resin composition forming the sealant layer of the film 10 contains PBS as a main component.

Second Exemplary Embodiment

Figure 3:
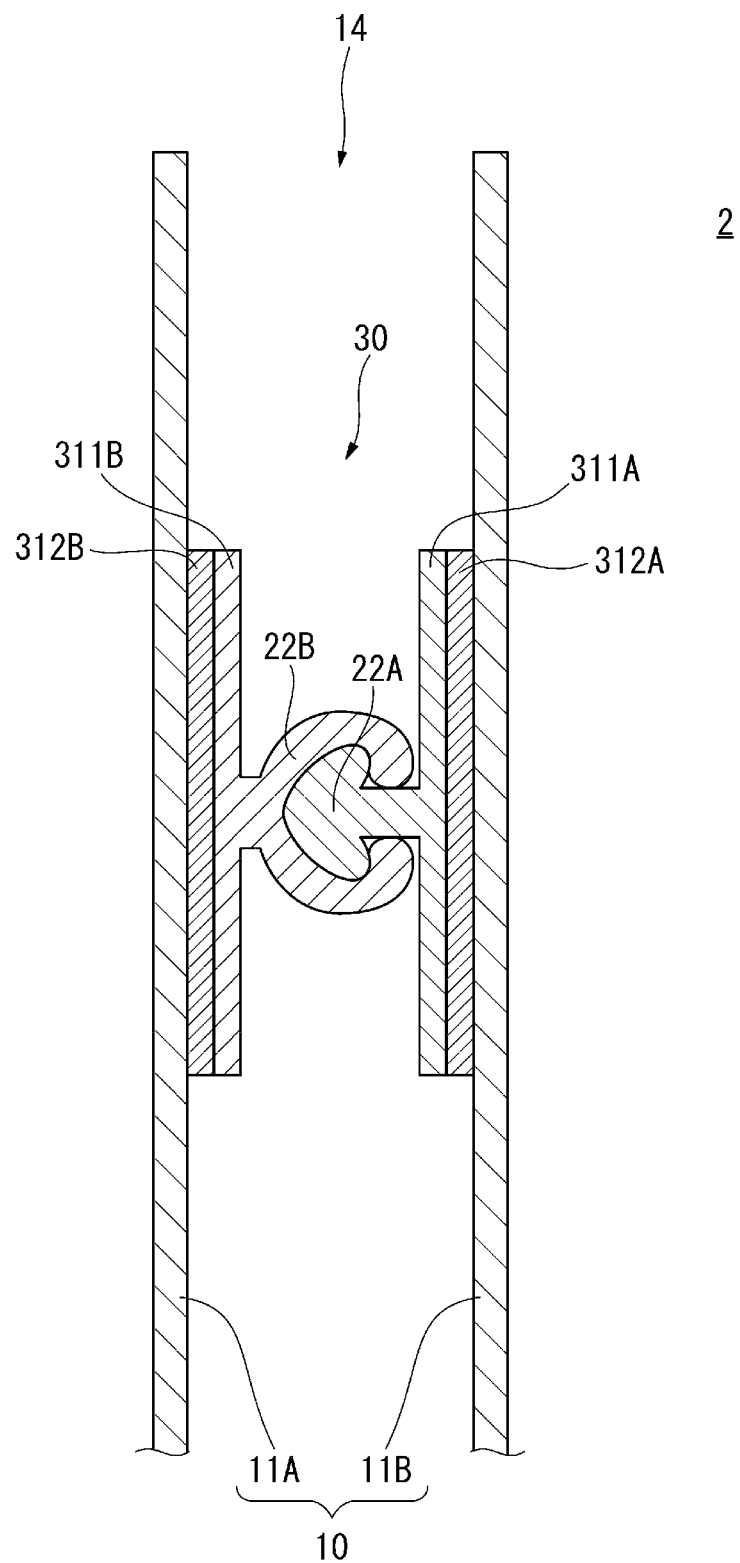
FIG. 3 is a cross-sectional view of a zipper-tape-equipped bag according to a second exemplary embodiment of the invention.

FIG. 3 is a cross-sectional view of a zipper-tape-equipped bag according to a second exemplary embodiment of the invention. As shown in FIG. 3, a zipper-tape-equipped bag 2 according to the second exemplary embodiment includes the film 10 and a zipper tape 30. It should be noted that a configuration of the film 10 is the same as in the above first exemplary embodiment and a redundant description is omitted below accordingly.

The zipper tape 30 includes second layers 312A and 312B and first layers 311A and 311B, the second layers 312A and 312B including seal surfaces of a pair of base strips that are to be bonded to the respective first surface 11A and second surface 11B of the film 10, the first layers 311A and 311B including surfaces opposite the seal surfaces of the respective base strips and engagement portions 22A and 22B. A biodegradable resin composition (a first resin composition) forming the first layers 311A and 311B including the engagement portions 22A and 22B is not limited but may be composed, for instance, as in the above first exemplary embodiment. It means that the biodegradable resin composition forming the first layers 311A and 311B is formed of a biodegradable resin composition having a yield strain of 3.4% or more during a tensile test. The yield strain is preferably 4% or more, more preferably 5% or more, further preferably 7% or more, much further preferably 10% or more, particularly preferably 15% or more. At a yield strain of 3.4% or more, the zipper tape becomes less plastically deformable and thus suitable for repeated use. The upper limit is usually, but not limited thereto, approximately 30%.

Meanwhile, in this exemplary embodiment, although the second layers 312A and 312B, which include the seal surfaces of the respective base strips of the zipper tape 30, may be formed of the same biodegradable resin composition (a first biodegradable resin composition) as the first layers 311A and 311B, it is preferable that the second layers 312A and 312B are formed of a biodegradable resin composition (a second biodegradable resin composition) containing different components. Although the second biodegradable resin composition is not limited in terms of components, it is preferable that the second biodegradable resin composition contains, for instance, at least any one of PBS, PBAT, or PBSA. It should be noted that in a case where PBS is contained, the content of PBS may be in a range from 20% to 100%, preferably in a range from 40% to 80%. Alternatively, the second biodegradable resin composition forming the second layers 312A and 312B may contain any other biodegradable resin, specifically, for instance, PLA, as a main component.

In a case where the biodegradable resin composition (the first biodegradable resin composition) forming the first layers 311A and 311B contains PBS and PBAT or consists of PBS and PBAT, the components of the biodegradable resin composition (the second biodegradable resin composition) forming the second layers 312A and 312B may include PBS and PBSA at a desired ratio where PBS is in a range from 0 to 100% and PBSA is in a range from 100 to 0%. It is preferable that the content of PBS is in a range from 0 to 90% and the content of PBSA is in a range from 100 to 10%.

In a case where the biodegradable resin composition (the first biodegradable resin composition) forming the first layers 311A and 311B contains PBS and PBAT or consists of PBS and PBAT, the components of the biodegradable resin composition (the second biodegradable resin composition) forming the second layers 312A and 312B may include PBS and PBAT at a desired ratio where PBS is in a range from 0 to 100% and PBAT is in a range from 100 to 0%. It is preferable that the content of PBS is in a range from 0 to 90% and the content of PBAT is in a range from 100 to 10%.

In a case where the biodegradable resin composition (the first biodegradable resin composition) forming the first layers 311A and 311B contains PBS and PBAT or consists of PBS and PBAT, the components of the biodegradable resin composition (the second biodegradable resin composition) forming the second layers 312A and 312B may include PBSA and PBAT at a desired ratio where PBSA is in a range from 0 to 100% and PBAT is in a range from 100 to 0%. It is preferable that the content of PBSA is in a range from 0 to 90% and the content of PBAT is in a range from 100 to 10%.

In a case where the biodegradable resin composition (the first biodegradable resin composition) forming the first layers 311A and 311B contains PBS and PBAT or consists of PBS and PBAT, the components of the biodegradable resin composition (the second biodegradable resin composition) forming the second layers 312A and 312B may include PBS, PBSA, and PBAT at a desired ratio where PBS is in a range from 0 to 100%, PBSA is in a range from 0 to 100%, and PBAT is in a range from 100 to 0%.

Further, for instance, in a case where the film 10 is formed of a biodegradable resin composition, the zipper tape 30 can be favorably bonded to the sealant layer of the film 10 formed of a biodegradable resin composition (a third biodegradable resin composition) by adjusting components of a resin composition forming a seal surface of the zipper tape 30, i.e., the biodegradable resin composition (the second biodegradable resin composition) forming the above second layers 312A and 312B, as described below.

More specifically, for instance, in a case where the biodegradable resin composition forming the second layers 312A and 312B contains 40% to 80% of PBS, the zipper tape 30 can be favorably bonded to the sealant layer of the film 10 irrespective of whether PLA or PBS is the main component of the biodegradable resin composition forming the sealant layer of the film 10. Further, for instance, in a case where the biodegradable resin composition forming the second layers 312A and 312B contains 40% or more of PLA, a favorable adhesiveness is achievable as long as the biodegradable resin composition forming the sealant layer of the film 10 contains PLA as a main component. Further, for instance, in a case where the biodegradable resin composition forming the second layers 312A and 312B contains 20% or more of PBS, a favorable adhesiveness is achievable as long as the biodegradable resin composition forming the sealant layer of the film 10 contains PBS as a main component.

Further, for instance, in a case where the biodegradable resin composition forming the second layers 312A and 312B contains PBSA, the zipper tape 30 can be favorably bonded to the sealant layer of the film 10 even though the biodegradable resin composition forming the sealant layer of the film 10 contains at least one of PBS or PBSA as a main component. Further, for instance, in a case where the biodegradable resin composition forming the second layers 312A and 312B contains PBS, a favorable adhesiveness is achievable as long as the biodegradable resin composition forming the sealant layer of the film 10 contains at least one of PBS or PBSA as a main component. Further, for instance, in a case where the biodegradable resin composition forming the second layers 312A and 312B contains 10% to 100% of PBSA, the zipper tape 30 can be more favorably bonded to the sealant layer of the film 10 even though the biodegradable resin composition forming the sealant layer of the film 10 contains at least one of PBS or PBSA as a main component. Further, for instance, in a case where the biodegradable resin composition forming the second layers 312A and 312B contains 0% to 90% of PBS, a more favorable adhesiveness is achievable as long as the biodegradable resin composition forming the sealant layer of the film 10 contains at least one of PBS or PBSA as a main component. Further, for instance, in a case where the biodegradable resin composition forming the second layers 312A and 312B contains 10% to 100% of PBSA and 0% to 90% of PBS, the zipper tape 30 can be further favorably bonded to the sealant layer of the film 10 even though the biodegradable resin composition forming the sealant layer of the film 10 contains at least one of PBS or PBSA as a main component.

Further, for instance, in a case where the biodegradable resin composition forming the second layers 312A and 312B contains PBS and PBAT at a desired ratio where PBS is in a range from 0 to 100% and PBAT is in a range from 100 to 0%, preferably, PBS is in a range from 0% to 90% and PBAT is in a range from 10% to 100%, the zipper tape 30 can be favorably bonded to the sealant layer of the film 10 even though the biodegradable resin composition forming the sealant layer of the film 10 contains at least one of PBS or PBSA as a main component.

Further, for instance, in a case where the biodegradable resin composition forming the second layers 312A and 312B contains PBSA and PBAT at a desired ratio where PBSA is in a range from 0 to 100% and PBAT is in a range from 100 to 0%, preferably, PBSA is in a range from 0% to 90% and PBAT is in a range from 10% to 100%, the zipper tape 30 can be favorably bonded to the sealant layer of the film 10 even though the biodegradable resin composition forming the sealant layer of the film 10 contains at least one of PBS or PBSA as a main component.

Further, for instance, in a case where the biodegradable resin composition forming the second layers 312A and 312B contains 0 to 100% of PBS, 0 to 100% of PBSA, and 100 to 0% of PBAT, the zipper tape 30 can be favorably bonded to the sealant layer of the film 10 even though the biodegradable resin composition forming the sealant layer of the film 10 contains at least one of PBS or PBSA as a main component.

The zipper tape 30 is formed by, for instance, coextrusion of the first biodegradable resin composition, which forms the first layers 311A and 311B including the engagement portions 22A and 22B, respectively, and the second biodegradable resin composition, which forms the second layers 312A and 312B including the seal surfaces of the respective base strips. It should be noted that the first layers 311A and 311B and the respective second layers 312A and 312B are not necessarily adjacent to each other and one or a plurality of additional layers may be formed between the first layer and the second layer. In this case, the base strips are each divided into a larger number of portions than in the above examples as shown and these portions are formed of respective different biodegradable resin compositions.

Even in this exemplary embodiment, it is also possible to improve the shape stability and engagement strength of the engagement portions 22A and 22B of the zipper tape 30 as in the first exemplary embodiment. Meanwhile, by adjusting the components of the biodegradable resin composition forming the seal surfaces of the base strips independently of those of the biodegradable resin composition forming the engagement portions 22A and 22B, for instance, a bonding performance between the base strips and the film 10 can be improved. Further, by means of the first and second biodegradable resin compositions containing a common component, for instance, PBS, a bonding performance between the first layers 311A and 311B and the respective second layers 312A and 312B can be kept favorable.

It should be noted that in order to prevent unintended biodegradation of the zipper tape from progressing, it is preferable that, for instance, produced zipper tapes are packaged in a manner to be able to block moisture in the first exemplary embodiment and the second exemplary embodiment. Specifically, the zipper tapes may be packaged by means of a packaging material using a stacked body of polyethylene terephthalate (PET), aluminum (AL), and linear low-density polyethylene (LLDPE), a stacked body of aluminum-metallized PET (VMPET), K coated nylon, and linear low-density polyethylene (LLDPE), or a stacked body including biaxially oriented polypropylene (OPP) and non-oriented polypropylene (CPP) respectively as a front surface layer and a back surface layer, or a variety of barrier packaging.

Further, in the first exemplary embodiment and the second exemplary embodiment, it is preferable that a desiccant is enclosed in packaging. Examples of the desiccant include silica gel.

Further, in the first exemplary embodiment and the second exemplary embodiment, a so-called bulk manner in which the zipper tapes are stored and packaged while being dropped and a so-called drum manner in which the zipper tapes are wound on a drum and packaged are both applicable; however, in terms of reducing bending of the zipper tapes due to rigidity thereof, the drum manner is more suitable.

EXAMPLES

Description will be made below on Examples of the invention.

Table 1 shows a relationship between a yield strain and a shape stability during a tensile test with the zipper tape 20 described above in the first exemplary embodiment, in which the base strips 21A and 21B and the engagement portions 22A and 22B were formed of a biodegradable resin composition containing, as a main component, PBS and PLA or PBAT. The shape stability was evaluated as "A" in a case where the yield strain was 6.0% or more and resealing was possible after unsealing and resealing were repeated for 100 times, evaluated as "B" in a case where the yield strain was 3.4% or more and less than 6.0% and resealing was possible after unsealing and resealing were repeated for 100 times, and evaluated as "C" in a case where the yield strain was less than 3.4% or resealing became impossible before unsealing and resealing were repeated for 100 times. Here, the yield strain was measured according to "JIS K 7161: 2014 Plastics-Determination of tensile properties." Specifically, a test piece was cut out of the base strip of the zipper tape and measured using a tester (manufactured by Shimadzu Corporation, AGS-X 1 kN) complying with JIS K 7161. For measurement, a cross-sectional area was defined as width×thickness of the test piece and a tension rate was set at 300 mm/min. As a result, it has been demonstrated that a yield strain of 3.4% or more during the tensile test provides a shape stability of "B" or higher. It should be noted that a shape stability of "A" is favorable for use as a zipper tape but "B" is also acceptable for some intended use.

It should be noted that the following PBS, PLA, and PBAT were used.

PBS (melting point: 115 degrees C. (by DSC method), flexural modulus: 650 MPa (according to ISO 178))

PLA (melting point: 160 degrees C. (by DSC method), tensile modulus: 4500 MPa (according to ISO 527))
PBAT (melting point: 110 to 120 degrees C. (by DSC method), tensile modulus: 80 MPa (according to ISO 527))

TABLE 1

Table 1: Shape Stability and Yield Strain in Examples and Comparative

|  | PLA(%) | PBS(%) | PBAT(%) | Shape Stability | Yield Strain (%) |
|---|---|---|---|---|---|
| Comp. 1 | 100 | 0 | 0 | C | 3.3 |
| Ex. 1 | 70 | 30 | 0 | B | 4.0 |
| Ex. 2 | 50 | 50 | 0 | B | 4.0 |
| Ex. 3 | 30 | 70 | 0 | B | 4.0 |
| Ex. 4 | 20 | 80 | 0 | A | 8.0 |
| Ex. 5 | 10 | 90 | 0 | A | 11.5 |
| Ex. 6 | 0 | 100 | 0 | A | 12.6 |
| Ex. 7 | 0 | 90 | 10 | A | 15.8 |
| Ex. 8 | 0 | 70 | 30 | A | 16.6 |

Next, regarding the zipper tape 30 described above as the second exemplary embodiment, Table 2 shows a result of measurement of a sealing strength between the biodegradable resin composition (the second biodegradable resin composition) forming the second layers 312A and 312B including the seal surfaces of the respective base strips and the biodegradable resin composition (the third biodegradable resin composition) forming the sealant layer of the film 10. Specifically, an evaluation sample, in which layers formed of the respective resin compositions were stacked and sealed for a sealing time of 1.0 second, at a sealing pressure of 2.0 MPa, and at a sealing temperature of 180 degrees C., was subjected to measurement of an interlayer heat sealing strength per width of 15 mm (N/15 mm) by using "Digital Force Gauge" manufactured by IMADA CO., LTD. It should be noted that with a tension rate during the sealing strength measurement set at 300 mm/min, a sealing strength of 20 (N/15 mm) or more is shown as "A" and a sealing strength less than 20 (N/15 mm) is shown as "C" in Table 2.

PBS (melting point: 115 degrees C. (by DSC method), flexural modulus: 650 MPa (according to ISO 178))
PLA (melting point: 160 degrees C. (by DSC method), tensile modulus: 4500 MPa (according to ISO 527))
PBAT (melting point: 110 to 120 degrees C. (by DSC method), tensile modulus: 80 MPa (according to ISO 527))
PBSA (melting point: 84 degrees C. (by DSC method), tensile modulus: 250 MPa (according to ISO 527))

TABLE 2

Table 2: Sealing Strength between Film and Base Strip (1)

| | | | Sealant Layer of Film | | | | | |
|---|---|---|---|---|---|---|---|---|
| | Main Component | Main Component | PLA | | | PBS | | |
| | | PLA(%)/PBS(%) | 100/0 | 80/20 | 60/40 | 40/60 | 20/80 | 0/100 |
| Seal Surface of Base Strip | PLA | 100/0 | A | A | A | A | C | C |
| | | 80/20 | A | A | A | A | C | C |
| | | 60/40 | A | A | A | A | A | A |
| | PBS | 40/60 | A | A | A | A | A | A |
| | | 20/80 | A | A | A | A | A | A |
| | | 0/100 | C | A | A | A | A | A |

TABLE 3

Table 3: Sealing Strength between Film and Base Strip (2)

| | | Sealant Layer of Film | | |
|---|---|---|---|---|
| | Main Component | Main Component PBS(%)/PBSA(%) | PBS | PBSA |
| Seal Surface of Base Strip | PBS | 100/0 | B | B |
| | PBS | 80/20 | A | A |
| | PBS | 60/40 | A | A |
| | PBSA | 40/60 | A | A |
| | PBSA | 20/80 | A | A |
| | PBSA | 0/100 | A | A |

TABLE 4

Table 4: Sealing Strength between Film and Base Strip (3)

| | | Sealant Layer of Film | | |
|---|---|---|---|---|
| | Main Component | Main Component PBS(%)/PBAT(%) | PBS | PBAT |
| Seal Surface of Base Strip | PBS | 70/30 | B | B |

It has been demonstrated from the result shown above in Table 2 that in a case where the biodegradable resin composition forming the seal surfaces of the base strips contains 40% to 80% of PBS, a favorable sealing strength is achievable irrespective of whether the biodegradable resin composition forming the sealant layer of the film 10 contains PLA or PBS as a main component. Further, it has been demonstrated that in a case where the biodegradable resin composition forming the seal surfaces of the base strips contains 40% or more of PLA, a particularly favorable sealing strength is achievable as long as the biodegradable resin composition forming the sealant layer of the film 10 contains PLA as a main component. Further, it has been demonstrated that in a case where the biodegradable resin composition forming the seal surfaces of the base strips contains 20% or more of PBS, a particularly favorable sealing strength is achievable as long as the biodegradable resin composition forming the sealant layer of the film 10 contains PBS as a main component.

Further, it has been demonstrated from the result shown above in Table 3 that in a case where the biodegradable resin composition forming the seal surfaces of the base strips is a mixture containing PBS and PBSA at a desired ratio, a favorable sealing strength is achievable irrespective of whether the biodegradable resin composition forming the sealant layer of the film 10 contains PBS or PBSA as a main component. Further, it has been demonstrated from the result shown above in Table 3 that by means of combined use of PBS and PBSA as the biodegradable resin composition forming the sealant layer of the film 10, a more favorable sealing strength is achievable as compared with in a case where the biodegradable resin composition consists of PBS.

Further, it has been demonstrated from the result shown above in Table 4 that in a case where the biodegradable resin composition forming the seal surfaces of the base strips is a mixture containing PBS and PBAT at a desired ratio, a sealing strength comparable to that in a case where the biodegradable resin composition consists of PBS as shown in Table 3 above is achievable.

The preferred exemplary embodiments of the invention are described above in detail with reference to the attached drawings; however, the invention is not limited to these examples. It is obvious to those skilled in the art to which the invention pertains that a variety of modifications or alterations are conceivable within the scope of the technical idea according to claims and it should be understood that these are also, of course, within the technical scope of the invention.

The invention claimed is:

1. A zipper tape in an elongated shape, comprising, in a cross-sectional shape, a pair of base strips and engagement portions projecting from respective surfaces facing each other of the pair of base strips, the engagement portions being engageable with each other, wherein
   at least the engagement portions each comprise a first biodegradable resin composition having a yield strain of 15% or more during a tensile test, and
   wherein the first biodegradable resin composition comprises, a content of polybutylene succinate (PBS) in a range of 60 mass % to 90 mass % and a content of poly (butylene adipate/terephthalate) (PBAT) in a range of 10 mass % to 40 mass %.

2. The zipper tape according to claim 1, wherein the first biodegradable resin composition further comprises a plasticizer.

3. The zipper tape according to claim 1, wherein the yield strain during the tensile test is equal to or less than 30%.

4. The zipper tape according to claim 1, wherein surfaces of the pair of base strips opposite the surfaces facing each other each comprise a second biodegradable resin composition different from the first biodegradable resin composition.

5. The zipper tape according to claim 4, wherein the second biodegradable resin composition comprises at least any one of polybutylene succinate (PBS), poly (butylene adipate/terephthalate) (PBAT), or poly (butylene succinate/adipate) (PBSA).

6. The zipper tape according to claim 4, wherein the second biodegradable resin composition comprises at least any one of polybutylene succinate (PBS) or poly (butylene succinate/adipate) (PBSA).

7. The zipper tape according to claim 6, wherein in the second biodegradable resin composition, a content of polybutylene succinate (PBS) is equal to or less than 90 mass % and a content of poly (butylene succinate/adipate) (PBSA) is in a range from 10 mass % to 100 mass %.

8. A zipper-tape-equipped container comprising:
   the zipper tape according to claim 1; and
   a container body to which the zipper tape is bonded.

9. The zipper-tape-equipped container according to claim 8, wherein the container body is in a form of a bag body.

* * * * *